United States Patent [19]

Sumiyoshi et al.

[11] Patent Number: 4,559,248

[45] Date of Patent: Dec. 17, 1985

[54] SLIDING MEMBER

[75] Inventors: Kikuo Sumiyoshi, Fujisawa; Kingo Miyasaka, Ayase, both of Japan

[73] Assignee: Oiles Industry Co., Ltd., Tokyo, Japan

[21] Appl. No.: 545,503

[22] Filed: Oct. 26, 1983

[30] Foreign Application Priority Data

Nov. 12, 1982 [JP] Japan .................. 57-197708

[51] Int. Cl.$^4$ .................. F16C 27/02; F16J 15/12
[52] U.S. Cl. .................. 428/36; 277/12; 277/30; 277/230; 277/234; 277/235 R; 277/DIG. 6; 285/94; 285/422; 285/423; 285/DIG. 10; 285/DIG. 11; 308/5 R; 308/6 R; 308/6 B; 308/DIG. 8; 428/240; 428/241; 428/242; 428/244; 428/247; 428/251; 428/253; 428/256; 428/259; 428/262; 428/408
[58] Field of Search .................. 277/DIG. 6, 12, 30, 277/230, 234, 235 R; 285/DIG. 10, DIG. 11, 94, 422, 423; 308/5 R, 6 R, 6 B, DIG. 8; 428/251, 253, 259, 36, 240, 241, 242, 244, 247, 252, 256, 262, 408

[56] References Cited

U.S. PATENT DOCUMENTS

| | | |
|---|---|---|
| 2,924,471 | 2/1960 | Poltorak et al. ............ 277/230 |
| 3,151,015 | 9/1964 | Griffeth ............ 308/DIG. 8 |
| 3,404,061 | 10/1968 | Shane et al. |
| 3,677,879 | 4/1970 | D'Andrea ............ 308/DIG. 8 |
| 3,726,738 | 4/1973 | Gellon et al. ............ 428/408 |
| 3,950,599 | 4/1976 | Board ............ 308/DIG. 8 |
| 4,080,233 | 3/1978 | McCloskey ............ 308/DIG. 8 |
| 4,209,177 | 6/1980 | Hall . |
| 4,214,761 | 7/1980 | Pippert ............ 277/230 |
| 4,234,638 | 11/1980 | Yamagoe et al. ............ 428/408 |
| 4,309,474 | 1/1982 | Hodes et al. ............ 308/DIG. 8 |
| 4,317,575 | 3/1982 | Cavicchia ............ 277/DIG. 6 |
| 4,333,975 | 6/1982 | Booth ............ 428/408 |
| 4,417,733 | 11/1983 | Usher ............ 285/DIG. 11 |
| 4,423,544 | 1/1984 | Kashmerick ............ 277/DIG. 6 |
| 4,455,334 | 6/1984 | Ogino et al. ............ 428/36 |
| 4,462,603 | 7/1984 | Usher et al. ............ 264/324 |
| 4,463,959 | 8/1984 | Usher et al. ............ 264/324 |
| 4,514,458 | 4/1985 | Thorn et al. ............ 428/36 |
| 4,516,782 | 5/1985 | Usher ............ 285/DIG. 11 |

FOREIGN PATENT DOCUMENTS 2031074  4/1980  United Kingdom .
1602989 11/1981  United Kingdom .

*Primary Examiner*—James C. Cannon
*Attorney, Agent, or Firm*—LeBlanc, Nolan, Shur & Nies

[57] ABSTRACT

A sliding member is disclosed wherein a sheet-like heat resistant material comprising expanded graphite, mica, etc. singularly or in combination, and a reinforcing material comprising either a combination of a mesh made of metal fine wires with a mesh made by weaving or knitting metal fine wires and fluoroplastic yarns together, or a mesh made by weaving knitting metal fine wires and fluoroplastic yarns together are integrally shaped so that at least on the sliding surface the metal fine wires and the fluoroplastic yarns are exposed, both constituting the reinforcing material, and the heat resistant material held by the metal fine wires and filling the meshes of the mesh as well as the voids formed between the metal fine wires in a mutually intermingled state, exhibiting a smooth surface.

4 Claims, 5 Drawing Figures

SLIDING MEMBER

BACKGROUND OF THE INVENTION

The present invention relates to a sliding member as used for machinery, structures, etc. and more particularly to a sliding member which can be used over a wide range of temperature from room to high temperatures and is suitable to be used in such technical fields wherein lubricants such as oil and grease are difficult to be applied to the sliding surface or when there is some aversion to the use of those lubricants, i.e. a member which is appropriate to be used in so-called dry frictional conditions.

Here throughout the specification and claims the term "sliding member" is intended to represent sliding plates, bushes, bearings, etc. which are used in machinery, apparatuses, structures, etc. which are subject to both load and slide, and also to include seals such as contact type packings which require a sealing function in addition to the above functions.

As sliding members of this kind those lubricants have been publicly known as listed below:

(i) one in which a base metal comprising cast iron, copper alloy, or stainless steel casting is formed with holes or grooves in which solid lubricants such as graphite, molybdenum disulfide, polytetrafluoroethylene (PTFE) or the like are filled and retained therein;

(ii) one in which metal powders of copper alloy, ferrous alloy, etc. are mixed with powders of solid lubricants such as graphite, molybdenum disulfide, and the mixture then being sintered; and (iii) mixed fabrics of PTFE yarns and other yarns are bonded on a metal material or synthetic resin as a base body by an adhesive or incorporated together by any suitable means.

Although those known sliding members are all superior in heat resistance, they have problems in friction and wear under dry frictional conditions, and also in mechanical strength, in particular the impact strength, and conformability with the mating material is not necessarily good, unable to fulfill its function sufficiently for minute sliding.

In order to solve these problems, as disclosed in U.S. Pat. No. 3,404,061 or Japanese Patent Publication No. 23966/1969 the manufacture of a sliding member by shaping expanded graphite which is obtainable by a special treatment of graphite together with a reinforcing material has been developed. This sliding member has heat resistance, having good conformability to a mating material, and the impact strength is remarkably improved compared with regular graphite, but the coefficient of friction is rather higher than that of regular graphite, and additionally it also has such a defect that it often generates abnormal frictional noises when sliding under dry frictional conditions. Although such sliding members that are obtainable by similarly shaping heat resistant materials such as mica, asbestos, etc. together with a reinforcing material have also been publicly known they also have similar problems.

These problems are considered to be due to a large difference between the coefficients of static and dynamic friction in these heat resistant materials and some flexibility of the sliding member composed of those material, etc. and also the effects of the shapes of the respective elements constituting the sliding system as well as the natural vibrations of the materials thereof.

In order to solve the above problems one of the present inventors already proposed together with several coinventors a sliding member as Japanese Patent Application No. 120701/1981 (hereinafter referred to as "prior art"). Here a brief explanation of the prior art will be given below. That is, it is a sliding member wherein a heat resistant material which is obtainable by mixing one or more of expanded graphite, mica, asbestos, etc. is shaped together with a reinforcing material which comprises a mesh made by weaving or knitting metal filaments, metal fine wires or the like, thus resulting in a sliding member base material, and the surface of the base material is covered with a lubricating compound comprising a polytetrafluoroethylene (PTFE) or tetrafluoroethylene-hexafluoropropylene-copolymer.

However, in this prior art, the lubricating compound covering the surface of the sliding member base material revealed such excellent characteristics that it exhibited low frictional properties in frictional sliding relative to the mating material, in particular in the beginning stage of friction, and low frictional resistance against sliding, generating no abnormal frictional noises. However, even though it exhibited very good characteristics problems have been found in that at higher temperatures a softening flow of the lubricating compound occurs and the compound falls out from the surface, resulting in frictional movement on the heat resistant material of the sliding member base material, and so generating abnormal frictional noises.

SUMMARY OF THE INVENTION

It is a principal object of the present invention to provide a sliding member which can solve the problems in the prior art as above described.

It is another object of the present invention to provide a sliding member which can exhibit superior characteristics over a wide range of temperature from room to higher temperatures.

It is a further object of the present invention to provide a sliding member which reveals superior sliding characteristics also in minute slippages.

It is a still further object of the present invention to provide a sliding member which does not generate abnormal frictional noises even in use under dry frictional conditions.

It is another object of the present invention to provide a sliding member which is resistant to wear, and excellent in durability.

In accordance with the present invention a sliding member is provided wherein a heat resistant sheet material comprising one or more of the heat resistant materials selected from the group composing of expanded graphite, mica, ceramics, asbestos, etc., singularly or in combination, is integrally shaped together with a reinforcing material which comprises either a combination of a mesh made of metal fine wires and a mesh obtainable by weaving or knitting metal fine wires and fluoroplastic yarns together, or a mesh made by weaving or knitting metal fine wires and fluoroplastic yarns together, resulting in a slidng member, at least on the sliding surface of which are exposed the metal fine wires and the fluroplastic yarns, both constituting the reinforcing material, and the heat resistant material filled within the meshes of the mesh and the voids formed between the metal fine wires in a mutually intermingled state, exhibiting a smooth sliding surface.

Thus, the sliding member in accordance with the present invention has such a constitution that on the surface i.e. sliding surface are exposed the fine metal wires and the fluoroplastic yarns, both constituting the mesh as the reinforcing material, and the heat resistant material held by the mesh in a mutually intermingled state and in a given area ratio. Therefore, in the early stages of friction of the sliding member the fluoroplastic exhibits its low frictional property so that the sliding frictional resistance against the mating member is remarkably reduced and the generation of abnormal frictional noises is also suppressed, bringing about such effects that the sliding member is appropriate in use for minute sliding, swinging within a minute angular range, etc.

As the method for manufacturing the sliding member having such a constitution as noted above the following several methods are conceivable.

First Method

A sheet-like heat resistant material such as expanded graphite and a metal mesh comprising metal fine wires as a reinforcing material are laid one upon another. In this case, the sheet-like heat resistant material has such a length that it protrudes at one or both ends of the sheet-like heat resistant material in its lengthwise direction for a length sufficient enough to convolute one winding in the succeeding convoluting process. Thus, the heat resistant material is lapped on the metal mesh so that the former protrudes from the latter at either its one end or both ends.

Subsequently, on the protruding portion(s) of the heat resistant material is laid a mesh which is made by weaving or knitting metal fine wires and fluroplastic yarns togeher, and the so formed laminate is convoluted from one end with the heat resistant material being located either on the inside or the outside, resulting in a cylindrical preform. A finished sliding member is then obtained by putting the preform into a metal die and compressing it axially.

Second Method

A metal mesh sleeve as a reinforcing material is knit from metal fine wires, the sleeve being collapsed radially so as to provide a band-like metal mesh, and a sheet-like heat resistant material is introduced into the metal mesh so that the former protrudes from the latter at its one end or both ends similar to the first method stated above.

A sleeve material which is made by knitting metal fine wires and fluoroplastic yarns together is collapsed radially so as to provide a band-like mesh. One or two sleeve materials so formed receive therein respectively the protruded portion(s) of the heat resistant material beyond the band-like metal mesh, and the so constituted laminate is convoluted from its one end, resulting in a cylindrical preform. A finished sliding member is obtained by putting the preform in a metal die and compressing it axially.

Third Method

A sheet-like heat resistant material is put on a mesh as a reinforcing material which is made by weaving or knitting metal fine wires and fluoroplastic yarns together. In this case the lengths of the heat resistant material and the mesh are the same. The laminate so formed is convoluted from one end so that the heat resistant material is on the inside or the outside, resulting in a cylindrical preform. A finished sliding member is obtained by putting the preform in a metal die and compressing it axially.

Fourth Method

As a reinforcing material metal fine wires and fluoroplastic yarns are knitted together so as to form a sleeve-like mesh, the mesh being radially collapsed to provide a band-like mesh, and a sheet-like heat resistant material is introduced into the band-like mesh. In this case, the lengths of the band-like mesh and the sheet-like heat resistant material are the same. The so formed laminate is then convoluted from one end so as to provide a cylindrical preform. A finished sliding member is obtained by putting the preform into a metal die and compressing it axially.

Fifth Method

As a reinforcing material metal fine wires and fluoroplastic yarns are knitted together so as to form a sleeve-like mesh, and a sheet-like heat resistant material is wound around the outer periphery of the mesh.

Thereafter the so constuted cylindrical laminate is folded back axially from one end so as to provide a cylindrical preform. A finished sliding member is obtained by putting the preform into a metal die and compressing it axially.

Sixth Method

As reinforcing materials a metal mesh made of metal fine wires and a mesh which is formed by weaving or knitting metal fine wires and fluroplastic yarns together are prepared.

After the metal mesh made of metal fine wires is convoluted so as to provide a cylindrical body, and after the mesh made of metal fine wires and fluoroplastic yarns is put on a sheet-like heat resistant material to form a laminate the laminate is introduced into the cylindrical body or wound around its outer periphery with the heat resistant material being inside for both cases, resulting in a cylindrical preform. A finished sliding member is obtained by putting the preform into a metal die and compressing it axially.

Seventh Method

As a reinforcing material a band-like metal mesh which is formed by radially collapsing a sleeve-like metal mesh made by knitting metal fine wires and a band-like mesh which is formed by radially collapsing a sleeve-like mesh made by knitting metal fine wires and fluoroplastic yarns together are prepared.

The bandlike metal mesh is convoluted to provide a cylindrical body. Introduced into the band-like mesh is a sheet-like heat resistant material, and the so constituted laminate is introduced into the cylindrical body or disposed around the outer periphery thereof, resulting in a cylindrical preforms.

A finished sliding member is obtained by putting the preform into a metal die and compressing it axially.

As stated, above, although there are several methods for manufacturing the sliding member in accordance with the present invention, by adopting the first and second methods in which the sheet-like heat resistant material is caused to protrude beyond the metal mesh at one of its ends or by the third, sixth or seventh method a sliding member as a finished product is obtainable in which on either the inside or the outside surface the metal wires, fluoroplastic yarns and heat resistant material are mixedly exposed.

Further, by adopting the first and second methods wherein the sheetlike heat resistant material is protruded beyond the metal mesh at both ends, and by the fourth and fifth methods a sliding member is obtainable in which on both of the inside and outside surfaces the metal wires, fluoroplastic yarns and heat resistant material are mixedly exposed.

As to the constitution of the materials comprising the heat resistant material and the reinforcing material as well as the shaping procedure the technique as disclosed in Japanese Laid-Open Patent Publication No. 76759/1979, Japanese Laid-Open Patent Publication No. 124766/1981, etc. is to be utilized.

BRIEF DESCRIPTION OF THE DRAWINGS

These and other objects of the present invention will become more apparent upon reading the following specification and upon reference to the attached drawings, in which.

DESCRIPTION OF THE PREFERRED EMBODIMENTS

Figure 1:
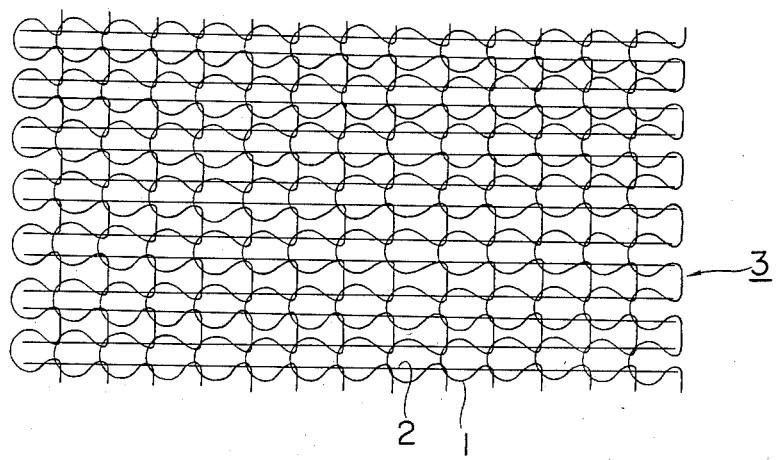
FIG. 1 is an exploded view of a mesh obtainable by knitting metal fine wires and fluoroplastic yarns together.

As above stated, the sliding member according to the present invention is generally manufactured from (a) a process to provide a preform and (b) a process to compress the preform.

The following descriptions are made in order of (1) a manufacturing method, (2) properties of the manufactured sliding member, (3) embodiments of the sliding member, (4) comparison test of the embodiments with the conventional sliding members, and (5) the test results.

1. Manufacturing Method (a) Process for Producing a Cylindrical Preform

This process is the one to produce a cylindrical preform such that a sheet-like heat resistent material such as expanded graphite and a reinforcing material which is either obtainable by combining a metal mesh made of metal fine wires with a mesh obtainable by weaving or knitting metal fine wires and fluoroplastic yarns together, or a mesh by weaving or knitting metal fine wires and fluoroplastic yarns together are integrally convoluted together.

In this process, the heat resistant material constituting the cylindrical preform comprises one or more of the materials selected from the group composed of expanded graphite, mica, asbestos, ceramics, etc., singularly or in combination. As the expanded graphite the powder of the expanded graphite disclosed is Japanese Patent Publication No. 23966/1979 and sold by Union Carbide Co. in the U.S.A. and the sheet manufactured from this powder are preferably utilized.

As the mica either the powder of natural or synthetic mica, or mica paper obtainable by bonding the mica powder with a silicon resin is utilized.

As asbestos, either fibers or powders of crysotile or amocite asbestos, or asbestos paper or an asbestos sheet, or the like are effectively used.

As the ceramic material a ceramic sheet material comprising alumina/silica fibers is preferable.

As the metal fine wires to constitute a metal mesh as a reinforcing material the most suitable one is to be selected according to the intended purposes and use, but in particular, as the ferrous metal fine wire a stainless steel wire, and as the copper base metal fine wire wires made of brass, nickel silver, berylium copper, phosphor bronze, cupro-nickel, or the like are respectively used. Also an aluminum alloy fine wire may be used.

For normal use a copper alloy fine wire, for use under high temperature or corrosive atmospheres a stainless steel fine wire or a cupro-nickel fine wire or the like and for use under the relatively high velocity sliding conditions an aluminum alloy fine wire or the like are respectively recommendable.

As the wire diameter of these metal fine wires about 0.1 to 0.5 mm is most appropriate for shaping the mesh and applying to the sliding member. That is, if the diameter is too small the difficulty in making the mesh is increased, but on the other hand, if the diameter is too large not only the making of the mesh is made difficult, but also the smoothness of the sliding surface is marred.

Next as the fluoroplastic yarns to be used as a reinforcing material by weaving or knitting the metal fine wires together a polytetrafluoroethylene or tetrafluoroethylene-hexafluoropropylene-copolymer in the form of a single or a spun yarn is preferable. For combining the yarn with the metal fine wires of the above stated diameter range the diameter of the yarn is preferably about 200 to 1,200 denier.

As to the method for the combining of this yarn with the metal fine wires the following two methods are conceivable:

A. A method to Produce a Woven Mesh

As a warp wire (warp yarn) one in which the metal fine wire and the fluoroplastic yarn are combined as a set is used, and as a weft wire (weft yarn) similarly one in which the metal fine wire and a fluoroplastic yarn are combined as a set is used. Alternatively, in these warp and weft wires the metal fine wire and the fluoroplastic yarn may be used separately without being cobmined.

B. Method to Produce a Knit Mesh

The metal fine wires and the fluoroplastic yarns are knit together as a set to form a sleeve-like mesh. In this case, in the knit mesh, even if the fluoroplastic yarns are supplied to a knitting machine under the same conditions as the metal fine wires the former is subjected to tension so that the yarns come to reside within the meshes or voides of the metal fine wires.

FIG. 1 is an exploded view of a sleeve-like knit mesh obtained by knitting the metal fine wires and the fluoroplastic yarns together, and in FIG. 1 the reference numeral 1 shows the metal fine wires, 2 shows the fluoroplastic yarns, and 3 shows a reinforcing material constituted by the mesh made of those materials.

As to the dimension of the meshes of the mesh thus produced it is preferable to be about 3 to 6 mm, whereby the term "meshes" is defined to designate the dimension between the metal fine wires. In this case, if the meshes are made too large, the compression ratio at the time of compressing and shaping of a convoluted preform to be explained later becomes too large, creating such disadvantages as necessitating that the depth of the metal die be deeper, while, if the meshes are made too small, the intermingling of the metal fine wires after compression and shaping of the preform will be insufficient, prone to generate a directionality in the formed product and therefore there is a fear of cracking between layers, a good product cannot be expected to be obtained.

Further, as to the combination of the metal fine wires with the fluoroplastic yarns many combinations such as one fluoroplastic yarn per metal fine wire, two fluoroplastic yarns per metal fine wire, etc. are possible.

Figure 2:
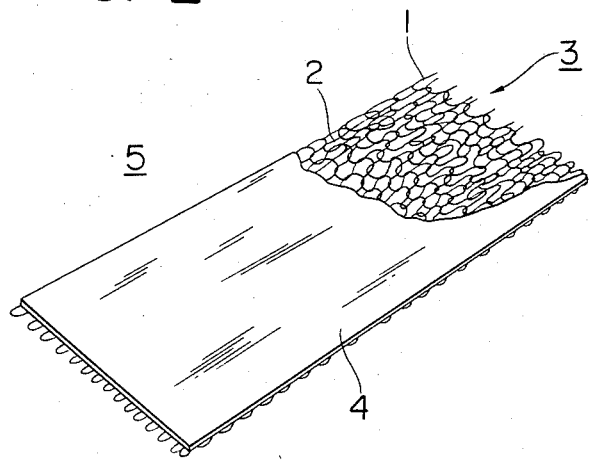
FIG. 2 is a perspective view illustrating the state wherein a mesh as a reinforcing material and a sheet-like heat resistant material are laid one upon another.

FIG. 2 shows the state that a sheet-like heat resistant material 4 such as above stated is put on the mesh 3 as a reinforcing material i.e. the mesh obtained by knitting the metal fine wires 1 and the fluoroplastic yarns 2 together.

The laminate 5 so formed from the sheet-like heat resistant material 4 and the mesh 3 is convoluted from one end with the reinforcing material 3 being either on the inside or the outside, resulting in a cylindrical preform.

Figure 3:
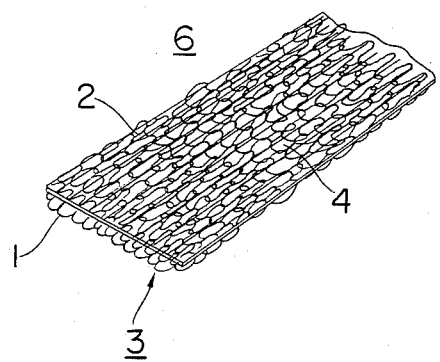
FIG. 3 is a perspective view illustrating the state wherein after a knitted sleeve-like mesh is collaped radially a sheet-like heat resistant material is introduced into the collapsed mesh.

FIG. 3 shows the state that, as a reinforcing material 3, first the metal fine wires 1 and the fluoroplastic yarns 2 are knit together to form a sleeve-like mesh, and the knit sleeve-like mesh is then collapsed radially so as to become a band-like mesh, and a sheet-like heat resistant material 4 is introduced into the reinforcing material 3 i.e. the band-like mesh. Thereafter, the so constituted laminate 6 is convoluted from one end, resulting in a cylindrical preform.

Figure 4:
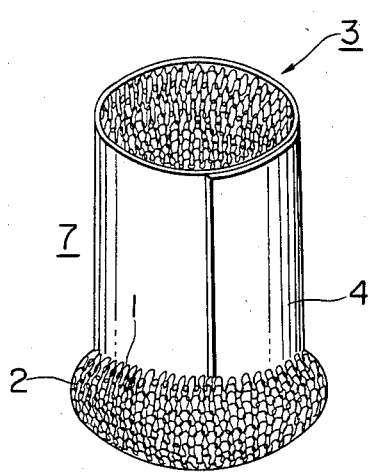
FIG. 4 is a perspective view illustrating the state wherein after a sheet-like heat resistant material is wound around the outer periphery of a knitted sleeve-like mesh the so constituted laminate is folded back axially from one end.

FIG. 4 shows the state that first, as a reinforcing material 3, metal fine wires 1 and fluoroplastic yarns 2 are knit together so as to form a sleeve-like mesh 3, and a sheet-like heat resistant material 4 is wound around the outer periphery of the sleeve-like mesh 3, and the so formed laminate 7 is folded back axially from one end, resulting in a cylindrical preform.

(b) Process to Compress the Preform

This process is one wherein the preform obtained by the process (a) is put into a metal die the cavity of which corresponds in shape and dimension to those of the finished sliding member to be formed and axially compressed to become the finished product (sliding member). In this case a compressive force of 1 to 3 t/cm$^2$ is preferable.

Figure 5:
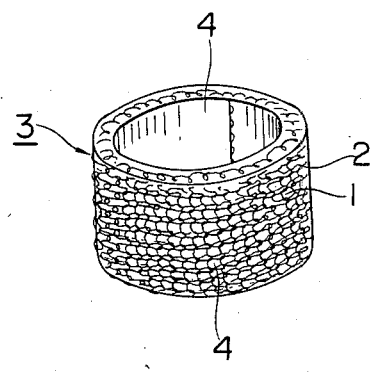
FIG. 5 is perspective view illustrating a cylindrical sliding member which is obtained such that after the reinforcing material (mesh) and the sheet-like heat resistant material are laid one upon another and the so formed laminate is convoluted the convoluted laminate is compressed axially.

FIG. 5 shows the finished product (sliding member) in a perspective view manufactured such that after a mesh 3, a reinforcing material, which is made, as shown in FIG. 2, by knitting metal fine wires 1 and fluoroplastic yarns 2 together and a sheet-like heat resistant material 4 are laid one upon another, the so formed laminate 5 is convoluted from one end with the reinforcing material 3 being located outside so as to provide a cylindrical preform, the preform being then put into a metal die to be compressed axially.

On the outer peripheral surface of this finished sliding member are exposed the metal fine wires 1 and the fluoroplastic yarns 2, both constituting the reinforcing material or mesh 3, as well as the heat resistant materials 4 filling the meshes of the mesh 3, all of them being in a mutually intermingled state as the result of their subjection to deformation under a strong compressive force within the metal die.

The surface on which the intermingled metal fine wires 1, fluoroplastic yarns 2 and heat resistant materials 4 are exposed constitutes the sliding surface of the finished sliding member.

2. Properties of the Sliding Member

Now the properties of the sliding member manufactured through the processes (a) and (b) will be explained.

The area ratio between the metal portion, the fluoroplastic portion and the heat resistant material portion on the sliding surface of the sliding member relative to the total area thereof are about 10 to 30%, 10 to 30% and 40 to 80%, respectively.

This area ratio changes variously depending on the following factors:
(i) the diameter of the metal fine wire;
(ii) the number of the fluoroplastic yarns combined relative to the metal fine wire;
(iii) the denier number of the fluoroplastic yarn;
(iv) the cross sectional configuration of the fluoroplastic yarn;
(v) the difference between whether the fluoroplastic yarn is single or a spun yarn;
(vi) in the case of a spun yarn, the number of filaments and the strength of their twist; and
(vii) the compressive pressure at the time of the shaping of the sliding member; etc.

For example, even if a single and a spun yarn have an identical denier number the area ratio of the fluoroplastic portion in the sliding member in which the mesh made of the latter is used is larger than one in which the mesh of the former is used.

This is due to the fact that this creates frays in the spun yarn at the time of compression and forming, and attention must be paid because if the fraying becomes remarkable the shifting surface becomes fluffed.

In order to meet the requirements of changing the area ratio of the fluoroplastic portion it is most typical and also to be recommended that it be handled such that the denier number and combination number of the fluoroplastic yarns are changed while the diameter of the metal fine wire is kept unchanged.

If an example is given, when two PTFE single yarns of 400 denier are combined with a metal fine wire of a diameter of 0.29 mm, and they are knitted into a mesh having meshes of 3 mm as a reinforcing material and after the mesh is overlapped by expanded graphite as a sheet-like heat resistant material and the so formed laminate is convoluted from one end with the reinforcing material being located outside so as to provide a cylindrical preform the preform is compressed and shaped axially under a force of 2.5 t/cm$^2$, the area ratio that the PTFE portion occupies on the sliding surface of the sliding member thus manufactured being about 25%.

Further, as a reinforcing material, one PTFE single yarn of 400 denier is combined with a metal fine wire of diameter of 0.29 mm and they are knitted into a mesh having meshes of 3 mm, and a sliding member is manufactured using this mesh with the other conditions being made so as to be the same as those in the above example, the area ratio that the PTFE portion occupies on the sliding surface of the sliding member thus manufactured being about 15%.

At this point, the operation and effects of the fluoroplastic yarns in the sliding member in accordance with the present invention will be explained.

The fluoroplastic (in particular, PTFE) is a substance with a very low coefficient of friction and it is publicly known that it is also used as a solid lubricant similar to graphite, molybdenum disulfide, etc. Additionally, it also reveals such properties or behaviour (which may be referred to as characteristics) as:

(i) there is no difference between the coefficient of static friction and the coefficient of dynamic friction; and
(ii) no "negative resistance" (i.e. the phenomena where the curve of the coefficient of dynamic friction relative to the increase in frictional velocity represents a negative gradient) is revealed, but rather a positive gradient is revealed.

The properties (i) and (ii) do not cause the sliding member in accordance with the present invention to generate a "sticking-slipping" at the time of rubbing, which prevents abnormal noises from being generated.

When the fluoroplastic is disposed on the sliding surface in the form of fluoroplastic yarns the wear resistance is superior to the case where the fluoroplastic is disposed on the sliding surface in the form of a coating of a powdered fluoroplastic. This is because that in the application in the form of the yarn the fluoroplastic molecules are oriented and so the strength is high, giving good effects in wear resistance.

On the sliding surface of the sliding member manufactured through the processes (a) and (b) the fine metal wires and the fluoroplastic yarns are exposed, both constituting the reinforcing material or mesh, and the heat resistant materials are held by the meshes of the mesh, in a mutually intermingled state and in a specific area ratio. Therefore, the low frictional property of the fluoroplastic yarns can be effectively revealed, the sliding frictional resistance against the mating material being remarkably decreased, and the occurrence of abnormal frictional noises is effectively prevented.

The fluoroplastic yarns exposed on the sliding surface do not fall out from the sliding surface in contrast with the case of the previously stated prior art in which the fluoroplastic is applied to the sliding surface in the form of a coating of the powder thereof, revealing such a defect as the falling out of the fluoroplastic, and they can exhibit superior characteristics for a long period of tiem even when used under dry frictional conditions.

EXAMPLES

Next some examples of the present invention will be described.

EXAMPLE I

As a reinforcing material one stainless steel fine wire (JIS SUS 304-W1) having a diameter of 0.29 mm and one polytetrafluoroethylene single yarn of 400 denier (trade name "Goatex Y 004 TI", sold by Junkosha Co. in Japan) were knit together so as to provide a mesh having meshes of 3 mm. (Note: here the term "JIS" is the abriviation for "Japanese Industrial Standards").

The reinforcing material and an expanded graphite sheet (sold by Union Carbide Co. in the U.S.A.), as a heat resistant material were laid one upon another.

Succeedingly the so formed laminate was convoluted from one end with the reinforcing material being located on the inside, resulting in a cylindrical preform.

The preform was then put into a metal die, and compressed axially under the following shaping conditions (these conditions being similarly applied to other examples as well as comparative products to be described later), thereby a cylindrical sliding member was obtained.

Shaping conditions

| | |
|---|---|
| Shaping temperature: | Room temperature |
| Shaping Pressure: | 2.5 t/cm$^2$ |
| Shaping Time: | 2 seconds |
| Compression Ratio: | 75%. |

In this sliding member the inner periphery constituted the sliding surface, the area ratio of the stainless steel portion, the polytetrafluoroethylene portion and the expanded graphite portion exposed on the sliding surface in a mutually intermingled state being as follows:

| | |
|---|---|
| Stainless steel portion: | 25% |
| Polytetrafluoroethylene portion: | 15% |
| Expanded graphite portion: | 60%. |

EXAMPLE II

As a reinforcing material a mesh was made such that one stainless steel wire the same as in Example I and two polytetrafluoroethylene single yarns of 400 denier (the same as in Example I) were knit together so as to have meshes of 3 mm, and a cylindrical sliding member was produced therefrom through the same process as in Example I.

The area ratio of the stainless steel portion, the polytetrafluoroethylene portion and the expanded graphite portion exposed on the inner peripheral surface of the sliding member in a mutually intermingled state being as follows:

| | |
|---|---|
| Stainless steel portion: | 20% |
| Polytetrafluoroethylene portion: | 25% |
| Expanded graphite portion: | 55%. |

EXAMPLE III:

As a reinforcing material a band-like mesh was prepared such that one nickel silver wire (C 7541 W) and two polytetrafluoroethylene single yarns (the same as in Example I) were knit together so as to have meshes of 3 mm. As a heat resistant material mica paper made by bonding mica pieces with silicon resin was selected and it was introduced into the band-like mesh. Succeedingly the so formed laminate was convoluted from one end to provide a cylindrical preform. The preform was then shaped through the same process as in Example I, resulting in a cylindrical sliding member.

On both of the inner and outer peripheral surfaces of this sliding member, the nickel silver portion, the polytetrafluoroethylene portion and the mica portion were exposed in a mutually intermingled state.

The area ratios of the exposed respective portions were as follows:

| | |
|---|---|
| Nickel silver portion: | 23% |
| Polytetrafluoroethylene portion: | 27% |
| Mica portion: | 50%. |

Comparison Tests

Now the tests carried out to compare the various examples of the present invention above described with the conventional sliding members will be explained. The comparative sliding members are as follows.

Comparative Product I:

This product was prepared according to the technique disclosed in Japanese Laid-Open Publication No. 76759/1979. That is, as a reinforcing material a mesh was made by knitting a stainless steel wire the same as that in Example I. After an expanded graphite sheet (the same as in Example I) was put on the reinforcing material the so formed laminate was convoluted from one end to produce a cylindrical preform, the preform then being shaped to a cylindrical sliding member through the same process as in Example I.

In this sliding member the expanded graphite was exposed on the inner peripheral surface, constituting the sliding surface.

Comparative Product II:

This product was prepared in accordance with the prior art, i.e. the technique disclosed in Japanese Laid-Open Publication No. 120701/1981.

As a reinforcing material a metal mesh was prepared by knitting a stainless steel wire in the same way as in Example I.

One of the surfaces of an expanded graphite sheet was covered with a polytetrafluoroethylene film having a thickness of 0.1 mm so that the latter protruded beyond one end of the former by a given length (i.e. the length equivalent to one winding at the time of the convolution to be described below).

After the sheet was laid on the reinforcing material the resulting laminate was convoluted from one end so that the polytetrafluoroethylene sheet was located on the inside, resulting in a cylindrical preform. The preform was then shaped to a sliding member through the same process as in Example I.

In this sliding member the polytetrafluoroethylene was exposed on the inner peripheral surface, constituting the sliding surface.

Comparison Tests

Concerning the various examples and the comparative products comparison tests were carried out under the following test conditions:

| Load: | 30 kg/cm$^2$ |
| --- | --- |
| Swing Angle: | ±3° |
| Swing Velocity: | 60 r.p.m. |
| Atmospheric Temperature: | 300° C. |
| Mating Material: | JIS SUS 304 |
| Number of Cycles: | 200,000. |

The test results are indicated in the following Table.

TABLE

| | | Coefficient of Friction (Mean Value) | Amount of Wear (mm) | Generation of Abnormal Noises |
| --- | --- | --- | --- | --- |
| Examples | I | 0.06 | 0.07 | No |
| | II | 0.05 | 0.06 | No |
| | III | 0.06 | 0.07 | No |
| Comparative Products | I | 0.10 | 0.20 | Generated after 50,000 cycles. |
| | II | 0.06 | 0.07 | Generated after 150,000 cycles. |

In general, in a sliding member the coefficient of friction and the amount of wear are in opposition, but, as apparent from the Table the sliding members in accordance with the present invention indicate properties substantially higher than those of the comparative products, and, in particular, when the coefficient of friction and the amount of wear are collectively evaluated, it will be apparent that the sliding members in accordance with the present invention exhibit balanced properties.

Further, although the sliding member of Comparative Product II exhibited properties in the coefficient of friction and amount of wear equivalent to the sliding member in accordance with the present invention, as the test progresses a part of the polytetrafluoroethylene on the sliding surface fell off so that at that part the sliding transformed into friction with the expanded graphite, and generation of abnormal frictional noises was recognized.

From the foregoing it will be appreciated that since, in the sliding member according to the present invention, the metal fine wires and the fluoroplastic on the sliding surface, both constituting a mesh as a reinforcing material, and the heat resistant materials held by the meshes of the mesh are exposed in a mutually intermingled state and in a given area ratio this does not cause the lubricating compound to fall off the sliding surface which was one of the defects of the prior art and this can improve the durability of a sliding member.

It is to be understood that although certain forms of the present invention have been illustrated and described, it is not to be limited thereto except so far as such limitations are included in the following claims.

What is claimed is:

1. A sliding member comprising: at least one heat resistant material selected from the group consisting of expanded graphite, mica, ceramic and asbestos; a reinforcing material in the form of either a combination of a metal mesh and a mesh made by weaving or knitting metal fine wires and fluoroplastic yarns together, or a mesh made by weaving or knitting metal fine wires and fluoroplastic yarns together, whereby said heat resistant material and said reinforcing material are integrally shaped so that at least on the sliding surface of said sliding member are exposed said fine metal wires and said fluoroplastic yarns, both constituting said reinforcing material, and said heat resistant material being retained by said mesh as well as filling the voids formed between said metal fine wires in a mutually intermingled state of heat resistant material and metal fine wires, and providing substantially a smooth surface.

2. A sliding member as claimed in claim 1 wherein said fine metal wires are formed of at least one material selected from the group consisting of stainless steel, copper alloy and aluminum alloy.

3. A sliding member as claimed in claim 1 wherein said fluoroplastic yarns are made of polytetrafluoroethylene or tetrafluoroethylene-hexafluoropropylene copolymer.

4. A sliding member as claimed in claim 1 wherein the area ratio of the portion of said fine metal wires, the portion of said fluoroplastic yarns and the portion of said heat resistant material exposed on said sliding surface is to 10 to 30%, 10 to 30%, and 40 to 80%, respectively.

* * * * *